W. KLEBER.
LATHE AND DRILLING CHUCK.
APPLICATION FILED FEB. 4, 1909.
938,873.
Patented Nov. 2, 1909.
2 SHEETS—SHEET 1.
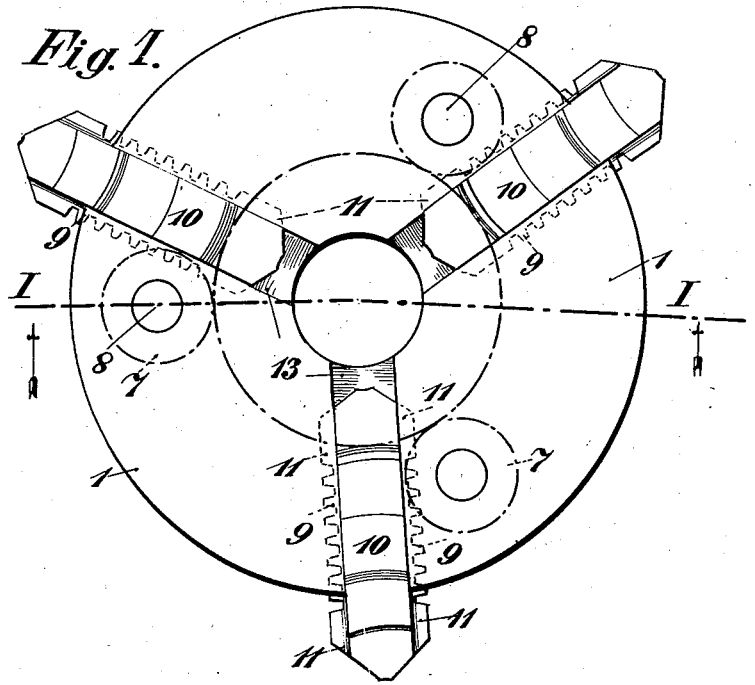
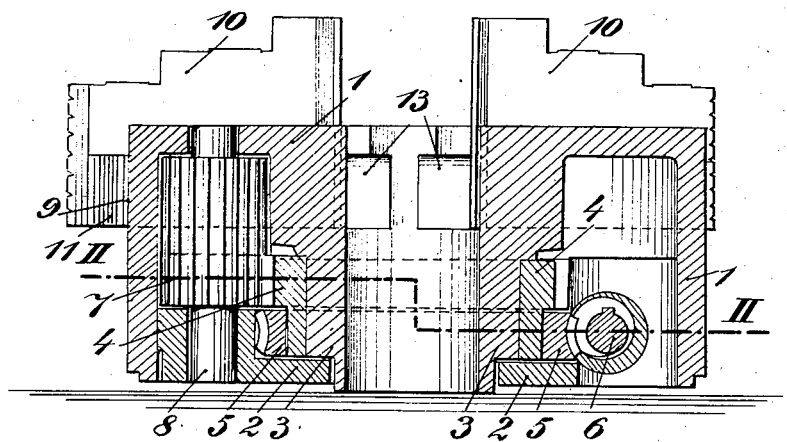
Witnesses:
Inventor:

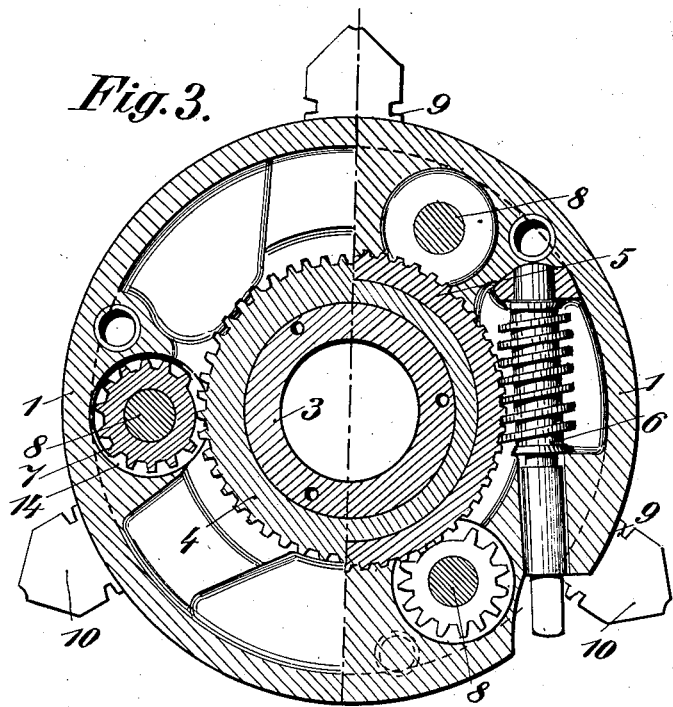

UNITED STATES PATENT OFFICE.

WALTER KLEBER, OF HALLE-ON-THE-SAALE, GERMANY, ASSIGNOR OF ONE-HALF TO BERTHOLD PÄSCHKE, OF TREPTOW, NEAR BERLIN, GERMANY.

LATHE AND DRILLING CHUCK.

938,873.  Specification of Letters Patent.  Patented Nov. 2, 1909.

Application filed February 4, 1909. Serial No. 476,070.

*To all whom it may concern:*

Be it known that I, WALTER KLEBER, a subject of the German Emperor, and resident of Halle-on-the-Saale, Germany, have invented certain new and useful Improvements in Lathe and Drilling Chucks, of which the following is a specification.

The invention relates to a lathe and drilling chuck in which the displacement of the gripping dogs formed with teeth is effected by a common controlling device so as to insure the self-centering of the gripping dogs.

The feature of the invention resides in the particular formation of the gripping dogs in such a manner as to cause them always to completely close the slideways toward the working side. This prevents the entering of metal chips into the operating mechanism and so obviates clogging and premature wearing out of the parts.

The accompanying drawings show the improved chuck, and Figure 1 is a face view thereof. Fig. 2 is a section taken on the line I—I of Fig. 1. Fig. 3 is a section taken on the line II—II of Fig. 2. Fig. 4 is a side view of one of the gripping dogs. Fig. 5 is a plan view of the gripping dog and its operating pinion. Fig. 6 is a side elevation of the said pinion.

The chuck casing 1 is fitted with the usual cover 2. Upon the hollow boss 3 is mounted a toothed wheel 4 for use in imparting simultaneous motion to other parts, said tooth wheel being rigidly connected with a worm-wheel 5 driven by the usual worm 6. The toothed wheel 4 engages with the pinions 7 which latter engage in the teeth 9 of the gripping dogs 10. The shaft 8 of each pinion is mounted crosswise in the chuck 1 and its cover 2 and this is only made possible by reason of the side teeth 9 of the gripping dogs 10. It is important to have plain feathers or keys 11 at the ends of the gripping dogs 10 in such a way as to exactly fit the guide grooves 13 and thus close the latter constantly in a perfect manner. Hereby the entering of metal chips into the operating mechanism is entirely prevented. By providing teeth 9 at each side of the gripping dogs with the keys 11 at each side and at each end thereof, it is made possible to reverse the gripping dogs and thereby enable them to serve for external and for internal gripping. This makes a second set of dogs unnecessary. In order to permit of the introduction of the dogs without having to take the whole chuck to pieces, it is necessary to make the driving pinions 7 of the dogs with a cut away surface 14, see Figs. 3, 5 and 6.

The improved lathe and ~~drill~~ing chuck has in addition to the advantages described, the further advantage of having its principal working parts very strongly mounted notwithstanding their comparatively reduced dimensions and weights. The gripping dogs can be very firmly tightened on to the work, and their unintentional loosening is altogether impossible.

What I claim as my invention and desire to secure by Letters Patent is:—

1. In a lathe and drilling chuck in combination reversible gripping dogs, guide grooves for the latter, teeth provided at both lengthsides of the said dogs, a pinion for each of the said dogs and engaging with the said teeth, keys at the ends of the said dogs and adapted to snugly fit the said guide grooves and to close the latter, and means for simultaneously turning the said pinions, substantially as and for the purpose set forth.

2. In a lathe and drilling chuck in combination reversible gripping dogs, guide grooves for the latter, teeth provided at both lengthsides of the said dogs, a pinion for each of the said dogs and engaging with the said teeth, keys at the ends of the said dogs and adapted to snugly fit the said guide grooves and to close the latter, a toothed wheel engaging with all said pinions, a worm wheel connected to the said toothed wheel, and a worm for turning the said worm wheel, substantially as and for the purpose set forth.

3. In a lathe and drilling chuck in combination reversible gripping dogs, guide grooves for the latter, a row of teeth at each lengthside of the said dogs, keys at each side and at each end of the said dogs and adapted to snugly fit the said guide grooves and to close the latter, a pinion for each of the said dogs and engaging with one of the said rows of teeth, a cut away surface formed on each of the said pinions and arranged to disengage the said pinions from the said dogs, a toothed wheel engaging with all said pinions, a worm wheel connected to the said toothed wheel, and a worm for turning the said worm wheel, substantially as and for the purpose set forth.

In testimony whereof I have hereunto signed my name this 18th day of January 1909, in the presence of two subscribing witnesses.

WALTER KLEBER.

Witnesses:
RUDOLPH FRICKE,
GEORG OTTO.